Jan. 5, 1965   L. J. WUBBE   3,163,876
ARM AND BLADE CONNECTOR
Filed Dec. 5, 1960
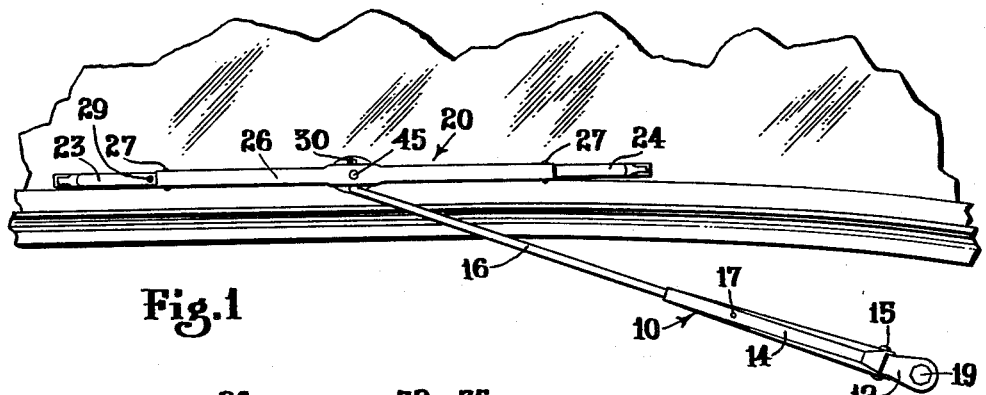
Fig.1
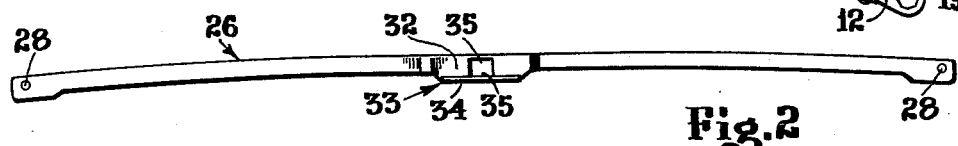
Fig.2
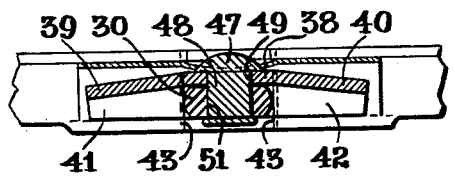
Fig.5
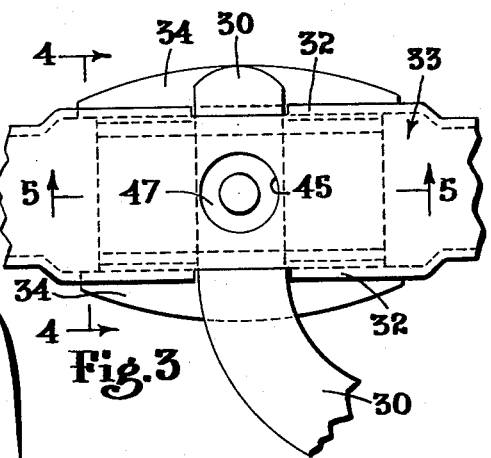
Fig.3
Fig.4
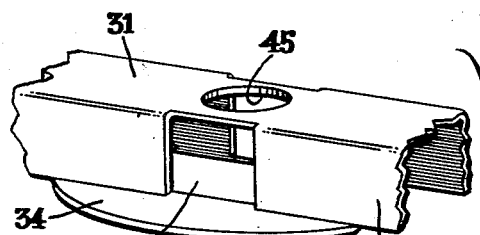
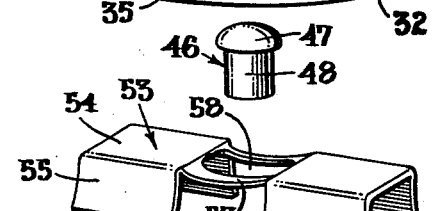
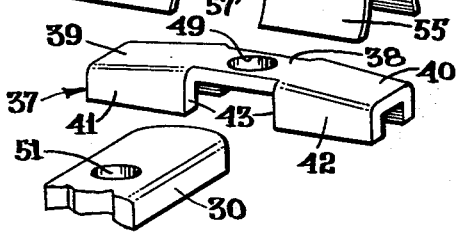
Fig.6
INVENTOR.
LEO J. WUBBE
BY W. E. Recktenwald
ATTORNEY

United States Patent Office 3,163,876
Patented Jan. 5, 1965

3,163,876
ARM AND BLADE CONNECTOR
Leo J. Wubbe, Beverly Shores, Ind., assignor to The Anderson Company, a corporation of Indiana
Filed Dec. 5, 1960, Ser. No. 73,666
4 Claims. (Cl. 15—250.32)

This invention relates to a windshield wiper arm-and-blade assembly and more particularly to an improved connection between the wiper arm and the wiper blade.

For many years windshield wiper arms have generally been constructed with a particular connection member at the outer end portion which is adapted to be engageable with a coacting connector carried on the back of a windshield wiper blade. Through the years, many different forms and shapes of connectors between the end of an arm and a blade have been designed and used. In fact, it has been the practice of certain manufacturers to periodically change the type and construction of the connector between an arm and blade so as to preserve as long as possible for their own business the exclusive ability to replace the blade when the original blade is worn out.

There are some disadvantages to the use of certain currently designed connectors in that the connectors raise the point of pressure application to the blade in such a way as to create the possibility of layover of the blade to such an extent that scratching the windshield may result. There also has been the problem that some connectors do not lock positively enough and become disconnected from the arm in such a way as to permit the wiper blade to fly off the windshield, particularly at high car speeds or in gusty winds.

Current connectors also sometimes cause an obstruction to vision by having the wiper arm, when in the parked position, extend into the line of vision of certain drivers, thereby creating a driving hazard.

The present invention is directed to a unitized jointed construction of the arm and the blade which eliminates the separate connector member from the back of the blade and permits the arm to apply pressure to the blade at a much lower relative position.

It is, therefore, a principal object of this invention to overcome the above-noted disadvantages of the prior art and to provide an improved connection between a wiper arm and a wiper blade.

It is another object of this invention to provide a simplified connection between an arm and a blade that is substantially inseparable during normal use.

It is still another object of this invention to provide a connection between an arm and blade which permits only limited movement of the blade relative to the arm.

It is a further object of this invention to provide an improved wiper arm-and-blade assembly wherein the connection therebetween does not needlessly restrict the ability of the blade to conform to the surface being wiped.

And a still further object of this invention is to provide an improved wiper arm-and-blade assembly that is simple in construction, uniform in operation, inexpensive to manufacture and maintain and relatively attractive in appearance.

And it is a still further object of this invention to provide an improved arm-and-blade assembly which permits the arm to be mounted on a pivot shaft that is located at a preset distance from the edge of the windshield to provide a flatter more effective wiping pattern on the surface being wiped.

Other objects and advantages of the invention will become apparent after the description hereinafter set forth is considered in conjunction with the drawing annexed hereto.

In the drawing:
FIGURE 1 is a front elevational view of a windshield wiper arm-and-blade assembly mounted on a vehicle with only fragmentary parts of the vehicle and windshield being shown;
FIGURE 2 is a side view of the channel-shaped bridge member of the wiper blade showing the arm attaching portion;
FIGURE 3 is an enlarged top view of the connection between the wiper arm and the wiper blade;
FIGURE 4 is a cross-sectional view taken along the lines 4—4 of FIGURE 3;
FIGURE 5 is a cross-sectional view taken along the lines 5—5 of FIGURE 3; and
FIGURE 6 is a blown up perspective view of certain parts of the connection between the wiper arm and the wiper blade.

Referring to the drawings and more particularly to FIGURE 1, a windshield wiper arm assembly 10 is illustrated which comprises an inner shaft-receiving section 12, a channel-shaped intermediate section 14 pivotally connected to the inner section by a cross pin or pivot 15 and an outer extension section 16 rigidly connected to the channel section by means of a rivet 17 or the like. The inner section 12 is adapted to be lockingly engaged with a pivot shaft by appropriate means such as a cap nut member 19. A spring member, not shown, of well-known construction, is positioned within the channel-shaped section 14 and is connected between the channel-shaped section 14, or the arm extension section 16, and the inner shaft-receiving section 12 so as to urge the outer end of the arm toward the surface being wiped. There are different forms and constructions of windshield wiper arms currently in use that are adapted to be attached to a wiper shaft and have spring means for urging the outer end of the arm toward the surface being wiped that could be used with the present invention without departing from the scope of said invention.

Wiper blades of any well-known construction, such as that structure in general use today which is shown and claimed in the basic United States patent to John W. Anderson, No. 2,596,063 are adaptable for use with the wiper arm 10 described above. A wiper blade designated as 20 in FIGURES 1 and 4 is comprised of a rubber wiping element or squeegee 21 having a wiping edge and a back portion supported by a backing strip or flexor 22 which limits flexure of the blade to a plane substantially perpendicular to the windshield being wiped and substantially supports the blade against flexure in a plane substantially parallel to the windshield being wiped. A pair of secondary yoke members 23 and 24 are slidingly engaged with the backing strip 22 by longitudinally spaced-apart claws carried by the respective end portions of said yoke members. A bridge member 26 is pivotally connected at each end portion to the medial portions of the secondary yokes 23, 24 by means of pins 27 passing through apertures 28 in the end portions of said bridge member. The yoke 23 is adapted to be disconnected from the bridge member 26 by means of a button 29 and a release mechanism of the type shown and described in U.S. Patent No. 2,897,530. The wiper blade described has been widely used for wiping curved surfaces of windshields, but it is to be understood that this invention is not limited to blades of this specific construction.

The connection between the end of the arm and the blade, as illustrated, is affected by having the outer end portion 30 of the wiper arm 10 disposed at an angle with respect to the longitudinal axis of said wiper arm. The particular size of the angle of the bend can vary depending upon the position of the pivot shaft upon which the arm is mounted and upon the relative angular disposition of the belt line of the windshield against which the blade is parked as in FIGURE 1. The extension section 16 of the arm and its end portion 30 are formed of generally flat stock with the width of said extension being several times greater than the thickness thereof. In the illustrated form, the end portion 30 and the extension section 16 lie in a common plane disposed along the top surface of both, although it is contemplated that the end portion 30 may, under certain conditions, have a slight angular disposition down or up with respect to the plane of the arm extension section 16, in addition to its sidewise disposition.

The bridge member 26 of the wiper blade is channel-shaped in cross section having a top wall 31 and spaced side walls 32. In the medial portion 33 of the bridge 26, the walls 32 are slightly longer and have sidewardly formed flanges 34 extending outwardly therefrom. A pair of elongate apertures 35 are formed through the respective sides 32 in the medial portion 33 of the channel-shaped portion 26 and are in substantial alignment with each other. Apertures 35 extend generally perpendicular to the longitudinal extent of bridge 26, but they may extend at an oblique angle relative thereto. The length of each aperture 35 in the bridge 26 is slightly greater than the width of the end portion 30 of the wiper arm so that said end portion can pass through said aligned apertures 35 in such a way as to be free to pivot to a limited extent about the axis of said end portion 30. The top wall 31 of the bridge member 26 has a large opening 45 formed therethrough in alignment with the central axis of the aligned apertures 35.

A specially formed stop member 37 is nested in the channel of the bridge 26 and is fastened to the end portion 30 of the arm. The stop member 37 is U-shaped in cross section and has a fastening portion 38 and a pair of downwardly sloping abutment surfaces 39, 40 integrally formed therewith. The abutment surfaces 39, 40 each have downturned side walls 41, 42, respectively, which have inner edges 43 spaced apart a distance substantially equal to the width of the end portion 30 of the arm. The amount of taper or slope that the abutment surfaces 39, 40 have relative to the fastening portion 38 is dependent upon the amount of relative movement desired between the arm and the blade.

The stop member 37 is inserted in the channel of the bridge 26 with its open end facing in the same direction as the opening the U of the channel. The end portion 30 of the wiper arm is inserted through apertures 35 in the bridge and through the openings formed by the edges 43 of the walls of the stop member 37. A rivet 46 with a head 47 smaller than the opening 45 in the bridge 26 passes through said opening 45 in said top wall 31 and has a body portion 48 extending through an aperture 49 formed in the fastening portion 38 of the stop member 37. Said portion 48 of the rivet next passes through an opening 51 formed through the end portion 30 of the arm and is secured thereto by peening the end of the rivet to the arm in such a way as to hold the arm assembled with the blade.

As shown in FIGURE 4, the stop member 37 has its side walls 41, 41 and 42, 42 spaced apart in such a way that the outer surfaces thereof are positioned slightly inwardly from the inner surfaces of the side walls 32 of the channel of the bridge member 26. Positioned between the walls 32 of the channel and said side walls 41, 41, 42, 42 of the stop member 37 is a combined spring-and-bearing member 53. Member 53 is U-shaped in cross section and has a back 54 and a pair of downturned leg portions 55 which leg portions are dish-shaped in cross section so as to resiliently cushion the sides 41, 42 of the stop member 37 relative to the sides 32 of the channel. The respective legs 55 of the member 53 are cut out midway between the ends thereof to permit the outer end portion 30 of the arm to pass therethrough.

The back 54 of the member 53 has a mid-portion 57 downwardly dish shaped with an opening 58 therethrough.

The lower portion of the dish-shaped mid-portion 57 of the bearing member 53 bears against the fastening portion 38 of the stop member 37 on opposite sides of the aperture 49 formed in said portion 38. The urging by the bearing member 53 against the stop member urges the arm end portion 30 against the lower walls of the apertures 35 in the bridge 26 and against the top face of the flanges 34 on said channel part of the bridge. The cushioning of the stop member 37 by the bearing member 39 both from above and from the sides reduces the play between the parts of the arm end portion, the stop member 37 and the bridge 26 thereby substantially eliminating the rattling noises incident thereto. The end portion of the wiper arm is attached to the blade from the side and is disposed below the top surface of said bridge member 26 of the blade so as to reduce to a substantial minimum lateral resistance of the assembly to windlift pressures.

It is believed to be readily apparent that the stop member 37 being rigidly attached to the end portion 30 of the wiper arm holds the wiper arm assembled with the wiper blade. The particular shape of the stop member 37; namely, the tapered abutment surfaces 39 and 40 are such that as the arm-and-blade assembly traverses a windshield surface, the blade is permitted to move relative to the arm a limited extent within the limits provided by the abutment surfaces 39, 40. When the arm-and-blade assembly is lifted from the windshield, the blade is limited a predetermined amount in its movement relative to the arm by the abutment surfaces 39 or 40 engaging with the inner surface of the channel-shaped bridge member 26.

The spacing between the walls 32 of the bridge 26 and between the walls 41 of the stop member 37 is such that the backing strip or flexor 22 of the wiping element can freely nest therebetween permitting the blade to flex a slight additional amount in conforming to the curved surface being wiped. In this way, the degree of arching of the bridge member 26 can be reduced to a minimum so as to lower the extent to which the top of the bridge protrudes away from the surface of the windshield. The appearance of the wiper blade is enhanced, in some cases, by a lower arch shape in the bridge. The lower arch shape in the bridge not only reduces the tendency of the blade to be raised from the windshield by wind currents but also reduces the tendency of the blade to roll over in such a way as to potentially scratch the windshield surface.

The attachment of the blade to the arm from the side as shown and described positions the arm, and to a lesser degree the blade, out of the line of vision of the driver so as to increase the useable area of the windshield. Since the arm is mounted to a pivot shaft that is displaced somewhat from the windshield, the wipe pattern subscribed by the blade will be wider and flatter on the windshielf, thereby providing a larger cleaned area for better and safer driving visibility.

Having thus described my invention, it is obvious that various modifications may be made in the same without departing from the spirit of the invention; and, therefore, I do not wish to be understood as limiting myself to the exact form, construction, arrangement and combination of parts herein shown and described.

I claim:

1. In a windshield wiper arm-and-blade assembly, an arm adapted to be oscillated by a pivot shaft across a surface to be wiped, an outer end portion of said arm having an axis disposed at an angle to the longitudinal axis of the major portion of the arm, a wiper blade connected to said outer end portion of the wiper arm and being adapted to conform to the surface being wiped, said wiper blade having a channel-shaped portion with transversely aligned apertures through which said end portion of the arm extends, and means fixedly fastened to said end portion of the arm and having spaced-apart portions selectively engaging with said channel-shaped portion of the blade assembly for limiting movement of said blade relative to said arm.

2. A windshield wiper assembly comprising an arm adapted to be oscillated by a pivot shaft across a surface to be wiped, an outer end portion of said arm being disposed at an angle to the longitudinal axis of the arm and lying in a plane substantially parallel to the surface being wiped, a wiper blade connected to said outer end portion of the wiper arm and being adapted to conform to the surface being wiped, said wiper blade having a channel-shaped portion with aligned apertures through which said end portion of the arm extends, means fastened to said end portion of the arm and selectively engaging with said channel-shaped portion of the blade for limiting movement of said blade relative to said arm, and means disposed between said last-named means and said channel-shaped portion of the blade for urging the end portion of the arm against one wall of each aperture in the blade for reducing play between the arm-and-blade assembly.

3. A windshield cleaner comprising an oscillatable wiper arm having a generally longitudinal axis and adapted for connection to a drive shaft to extend generally radially therefrom and be urged toward a surface being wiped, an extension near the outer end of the wiper arm having an axis disposed transversely to the arm axis and lying in a plane containing the axis of the arm, said axes lying in a relatively fixed common relationship throughout the oscillatable movement of the wiper arm, an elongate flexible wiping blade having an articulatable pressure-applying superstructure, said superstructure pivotally receiving the extension of the arm at a location below an upper extremity of said superstructure and adapted to apply pressure received therefrom to spaced-apart locations on the wiping blade in a plane substantially perpendicular to the relatively fixed axes of the arm and extension, the connection between the extension and superstructure comprising means limiting the pivotal movement of the superstructure about the axis of the extension, and additional means provided with the connection between the extension and superstructure providing friction between relatively movable parts of the extension and superstructure to limit free movement therebetween.

4. A windshield wiper blade-and-arm assembly comprising: a wiper blade including a squeegee and a pressure-distributing superstructure, an oscillatable pressure-applying wiper arm having a longitudinally extending portion terminating in a laterally disposed portion pivotally received within generally transversely disposed apertures in said pressure-applying superstructure below the vertical extremity thereof for relative rocking movement of said blade in a plane passing vertically through the blade and superstructure, said longitudinal extending portion and said laterally disposed portion each disposed at an angle intersecting said vertical longitudinal plane, said apertures are located in spaced-apart wall portions of said pressure-applying superstructure, and abutment means are provided on said superstructure adjacent said connection between said arm and said superstructure to limit the pivotal movement of said blade with respect to said arm.

References Cited in the file of this patent
UNITED STATES PATENTS

| | | |
|---|---|---|
| 1,947,185 | Browett | Feb. 13, 1934 |
| 2,295,011 | Rodrick | Sept. 8, 1942 |
| 2,739,337 | O'Shei | Mar. 27, 1956 |
| 2,751,620 | Ehrlich | June 26, 1956 |
| 2,852,796 | Leins | Sept. 23, 1958 |
| 2,973,542 | Horton | Mar. 7, 1961 |

FOREIGN PATENTS

| | | |
|---|---|---|
| 265,686 | Great Britain | Feb. 10, 1927 |
| 838,419 | Great Britain | June 22, 1960 |